US008534670B2

(12) United States Patent
Sugiyama et al.

(10) Patent No.: US 8,534,670 B2
(45) Date of Patent: Sep. 17, 2013

(54) SHEET CONVEYING DEVICE, SHEET POST-PROCESSING APPARATUS, AND IMAGE FORMING APPARATUS

(75) Inventors: Keisuke Sugiyama, Tokyo (JP); Tomohiro Furuhashi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 4 days.

(21) Appl. No.: 13/064,533

(22) Filed: Mar. 30, 2011

(65) Prior Publication Data

US 2011/0248440 A1 Oct. 13, 2011

(30) Foreign Application Priority Data

Apr. 7, 2010 (JP) ................................ 2010-088953
Jan. 21, 2011 (JP) ................................ 2011-011150

(51) Int. Cl.
*B65H 5/02* (2006.01)

(52) U.S. Cl.
USPC .......................................................... 271/272

(58) Field of Classification Search
USPC ..................... 271/272–274, 314; 492/45, 48, 492/49, 60
See application file for complete search history.

(56) References Cited

U.S. PATENT DOCUMENTS 4,178,664 A * 12/1979 McLoughlin .................. 492/56

FOREIGN PATENT DOCUMENTS

| | | | |
|---|---|---|---|
| JP | 59-36049 | * | 2/1984 |
| JP | 60-61443 | * | 4/1985 |
| JP | 61-56354 | | 4/1986 |
| JP | 64-17749 | * | 1/1989 |
| JP | 10-203677 | * | 8/1998 |
| JP | 3933829 B | | 3/2007 |
| JP | 2007-119091 | | 5/2007 |
| JP | 2007-119110 | * | 5/2007 |
| JP | 2010-006538 A | | 1/2010 |

OTHER PUBLICATIONS

Abstract of JP 2001-048392 published on Feb. 20, 2011.
European Search Report dated Aug. 12, 2011 issued on corresponding European Application No. 11250434.5.

* cited by examiner

*Primary Examiner* — Thomas Morrison
(74) *Attorney, Agent, or Firm* — Harness, Dickey & Pierce, P.L.C.

(57) ABSTRACT

A sheet conveying device includes a first rotating shaft, a driving roller fixed to the first rotating shaft, a driven roller that faces and is pressed against the driving roller, and a second rotating shaft supporting the driven roller. The driving roller or the driven roller includes a cylindrical center portion, and end portions located at both ends of the center portion and having an approximately circular truncated cone shape. Surfaces of the center portion and the end portions are made of an elastic material. An outer surface of the center portion is matched with outer surfaces of one end of the end portions, and a diameter of another end of the end portions is larger than a diameter of the one end. The end portions have a hollow inside, and have a thin surface.

14 Claims, 5 Drawing Sheets

604 603 604 SHEET (THIN PAPER) 602b 602a 607 605 607 602a 602b 601 608 608

SHEET CONVEYING DEVICE, SHEET POST-PROCESSING APPARATUS, AND IMAGE FORMING APPARATUS

CROSS-REFERENCE TO RELATED APPLICATIONS

The present application claims priority to and incorporates by reference the entire contents of Japanese Patent Application No. 2010-088953 filed in Japan on Apr. 7, 2010 and Japanese Patent Application No. 2011-011150 filed in Japan on Jan. 21, 2011.

BACKGROUND OF THE INVENTION

1. Field of the Invention

The present invention relates to a sheet conveying device for conveying sheets, and a sheet post-processing apparatus and an image forming apparatus.

2. Description of the Related Art

As image forming apparatuses or sheet post-processing apparatuses have come to perform processes at a higher speed and become more multi-functional, the image forming apparatuses and the sheet post-processing apparatuses have come to be demanded to be able to handle sheets of various thicknesses (thin paper and thick paper) and of various types (special coated paper, different grain directions, and so on). Such an apparatus uses a sheet conveying device as means for conveying (including feeding and discharging) a sheet in the apparatus. The sheet conveying device conveys a sheet by driving and rotating a pair of rollers and passing the sheet between the rollers (nip). In a sheet conveying device, especially upon conveying and discharging soft sheets such as thin paper sheets onto a tray, the sheets may be stacked defectively because the sheets may bend during the discharging process. On the contrary, upon conveying and discharging a hard sheet such as a thick paper sheet onto a tray, if an excessive force is applied by the discharging rollers or near the discharging rollers to the paper to prevent it from bending, traces of the rollers would remain on the sheet, resulting in low quality. Forms and structures of discharging rollers for accommodating different sheets with contradicting properties are already known.

However, the forms and the structures of the conventional discharging rollers require modification of structures depending on user demands, and hence, users sometimes have to go through a replacement process. Some other times, such discharging rollers cannot fully accommodate increasing types of sheets that have recently come to be available, and limits the types of sheets that can be used.

To apply a sheet-strengthening force when a softer sheet is conveyed and to reduce the amount of sheet-strengthening force when a harder sheet is conveyed, Japanese Patent Application Laid-open No. 2010-006538 discloses a plurality of discharging rollers having a discharging ring that is larger in diameter than the outer diameter of the discharging rollers and made of a low-elastic material such as rubber or sponge. In a way, such a structure is similar to the present invention, because both of these inventions take advantage of elastic deformation to change the amount of sheet-strengthening force depending on the type of sheet to be processed. However, Japanese Patent Application Laid-open No. 2010-006538 only discloses changing the amount of the sheet-strengthening force by changes in diameter, and such a structure has not solved the problem of not being able to accommodate a wide range of sheet types. Furthermore, in such a structure, the discharging rollers and the discharging rings have to be created as separate members. Therefore, the apparatus becomes more complex, and the cost is also increased.

The present invention is made in consideration of the above, and an object of the present invention is to provide a sheet conveying device, a sheet post-processing apparatus, and an image forming apparatus that can accommodate a wide range of sheet types including soft sheets such as thin paper and hard sheets such as thick paper.

SUMMARY OF THE INVENTION

It is an object of the present invention to at least partially solve the problems in the conventional technology.

According to one aspect of the present invention, a sheet conveying device includes a pair of rollers including a first rotating shaft that is rotated by receiving power from a driving source, a driving roller that is fixed to the first rotating shaft, a driven roller that faces and is pressed against the driving roller so as to be driven to rotate, and a second rotating shaft that supports the driven roller, the sheet conveying device conveying a sheet by passing the sheet through the pair of rollers being rotated, wherein the driving roller or the driven roller includes a cylindrical center portion applying a conveying force to the sheet to move the sheet forward, and end portions located at both ends of the center portion and having an approximately circular truncated cone shape, surfaces of the center portion and the end portions are made of an elastic material, an outer surface of the center portion is matched with outer surfaces of one end of the end portions, and a diameter of another end of the end portions is larger than a diameter of the one end of the end portions, and the end portions have a hollow inside of the approximately circular truncated cone shape, and have a thin surface.

According to another aspect of the present invention, a sheet post-processing apparatus includes the sheet conveying device as described above.

According to still another aspect of the present invention, an image forming apparatus includes the sheet conveying device as described above, or the sheet post-processing apparatus as described above.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An exemplary embodiment according to the present invention is described below in greater detail with reference to the accompanying drawings.

A sheet conveying device according to the embodiment includes a pair of rollers having a driving roller fixed to a rotating shaft and a driven roller facing and being pressed against the driving roller so as to be driven to rotate. At least one of the driving roller and the driven roller is made of a low-elastic material. End portions of the roller function as sheet-strengthening brims having a hollow conical form. When a soft sheet such as thin paper is conveyed (passing) through the rollers, sheet-strengthening force is applied to the sheet deforming the sheet into a wave-like form in accordance with the form of the sheet-strengthening brims having a hollow conical form. When a hard sheet (especially, special coated thick paper) is conveyed (passing) through the rollers, the end portions of the roller deform elastically due to the stiffness of the sheet itself.

Figure 1:
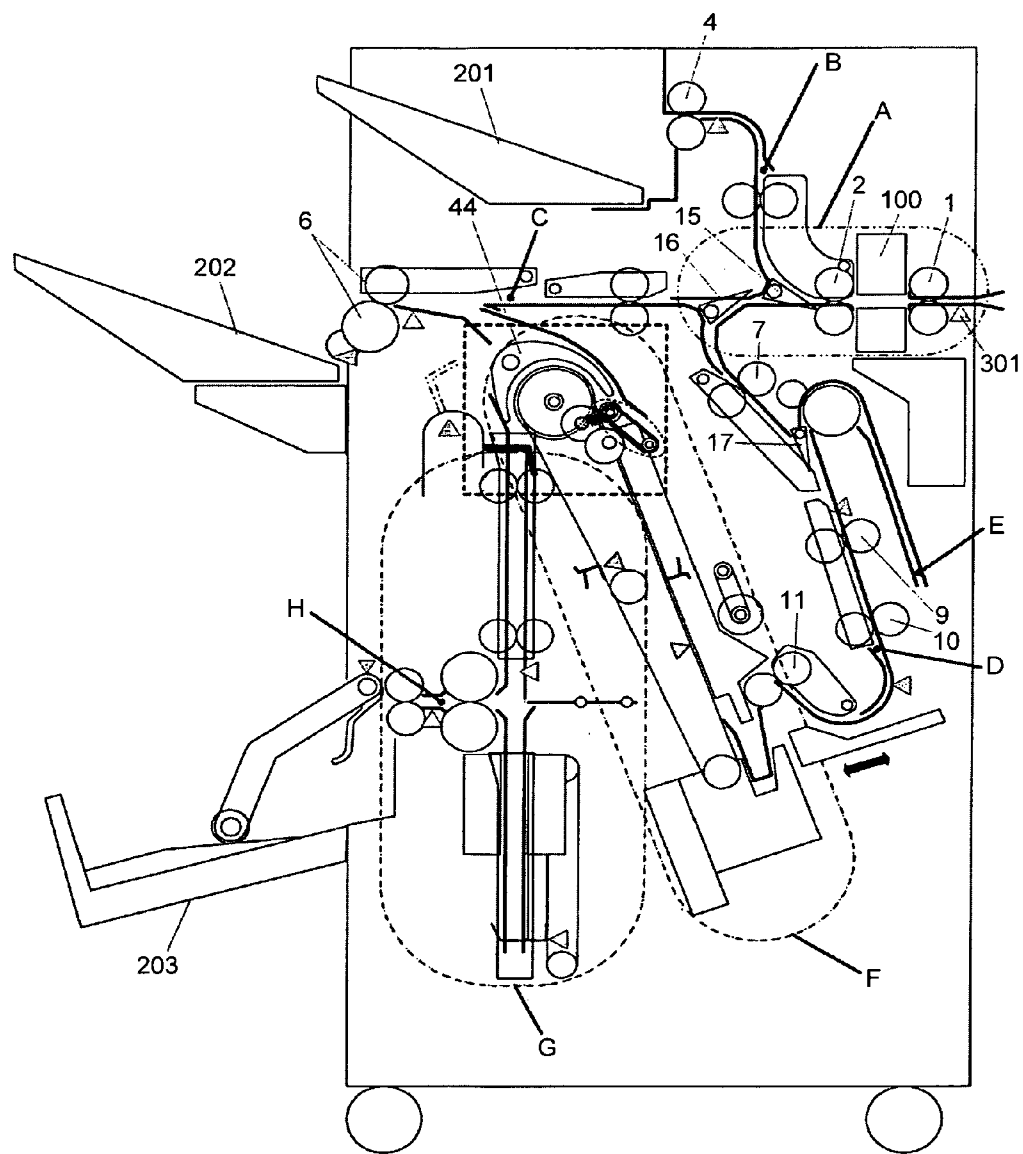
FIG. 1 is a schematic of an overall structure of a sheet post-processing apparatus according to an embodiment of the present invention.

FIG. 1 is a schematic of an entire structure of a sheet post-processing apparatus according to the embodiment.

In the explanation below, it is assumed that the sheet post-processing apparatus according to the embodiment illustrated in FIG. 1 is connected to a given image forming apparatus (e.g., the image forming apparatus illustrated in FIG. 9). A feeding function for feeding a sheet, stapling functions of various types, and control operations for controlling these functions are conventionally known, and therefore, detailed explanations thereof will not be provided below.

The sheet post-processing apparatus according to the embodiment is connected to a side of (subsequent to) the image forming apparatus. A sheet discharged by the image forming apparatus (a sheet on which an image is formed, for example) is guided into the sheet post-processing apparatus according to the embodiment. The sheet is passed through a conveying path A having a post-processing unit (e.g., a punching unit) for providing a post-process to each sheet, as illustrated in FIG. 1. A bifurcating claw 15 and a bifurcating claw 16 then guide the sheet to one of a conveying path B connected to an upper tray 201, a conveying path C connected to a shift tray 202, and a conveying path D connected to a processing tray F where the sheets are aligned and stapled, for example.

In the processing tray F, the sheets are aligned and stapled, for example. Then, the aligned and stapled sheets are guided by a guiding member 44, which is a deflecting unit, to the conveying path C connected to the shift tray 202 or to a processing tray G where folding, for example, is performed. The sheet folded in the processing tray G is passed through a conveying path H and guided into a lower tray 203.

A bifurcating claw 17 is arranged in the conveying path D, and is kept at a position illustrated in FIG. 1 by a low-load spring not illustrated. After the trailing edge of the sheet passes through the bifurcating claw 17, at least one pair among a pair of carriage rollers 9, pair of carriage rollers 10 and pair of stapling discharging rollers 11 is driven in a reverse direction to guide the trailing edge of the sheet into a sheet maintaining unit E and stack the sheet therein, so that the next sheet can be placed over the previous sheet and conveyed together. By repeating these operations, two or more sheets can be placed over one another and conveyed together.

An entrance sensor 301 that detects a sheet fed from the image forming apparatus is arranged along the conveying path A located upstream of and shared among the conveying path B, the conveying path C, and the conveying path D. A pair of entrance rollers 1, a punching unit 100, a pair of carriage rollers 2, the bifurcating claw 15, and the bifurcating claw 16 are arranged downstream of the entrance sensor 301 in this order. The bifurcating claw 15 and the bifurcating claw 16 are kept at positions illustrated in FIG. 1 by means of springs not illustrated. Solenoids not illustrated are turned ON to rotate the bifurcating claw 15 upwardly and to rotate the bifurcating claw 16 downwardly, so that the path of the sheet is switched among the conveying path B, the conveying path C, and the conveying path D.

To guide the sheet into the conveying path B, the bifurcating claw 15 is kept at the position illustrated in FIG. 1 by keeping the solenoid OFF. To guide the sheet into the conveying path C, the solenoid is turned ON in the configuration illustrated in FIG. 1, to rotate the bifurcating claw 15 upwardly and to rotate the bifurcating claw 16 downwardly. To guide the sheet into the conveying path D, the bifurcating claw 16 is kept at the position illustrated in FIG. 1 by keeping the solenoid OFF, while turning ON the solenoid to rotate the bifurcating claw 15 upwardly from the position illustrated in FIG. 1.

The sheet conveying device according to the embodiment is included in the sheet post-processing apparatus according to the embodiment having the structure explained above. In the explanation below, the sheet conveying device according to the embodiment is realized as a sheet discharging device, and a pair of shift tray discharging rollers 6 for discharging a sheet onto the shift tray 202 will be explained as an example. Alternatively, the sheet conveying device according to the embodiment may be applied to any pair of rollers required to apply sheet-strengthening force on a sheet being conveyed. In the example illustrated in FIG. 1, the sheet conveying device according to the embodiment may be applied to a pair of upper tray discharging rollers 4 for discharging a sheet onto the upper tray 201, a pair of carriage rollers 7 for guiding a sheet into the sheet maintaining unit E, or the pair of stapling discharging rollers 11 that guides the sheet into the staple tray.

Figure 2:
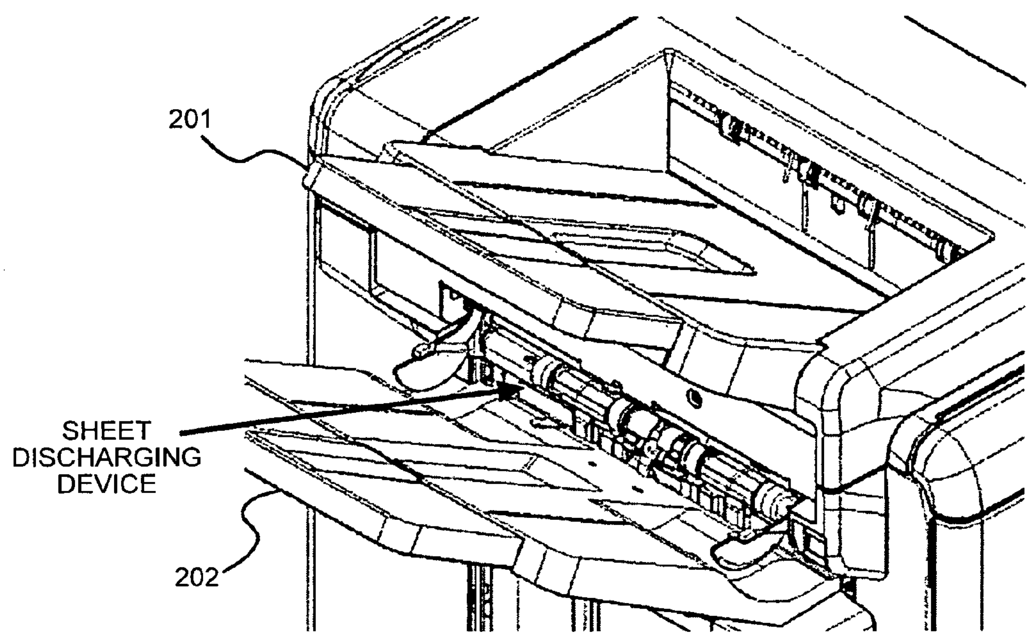
FIG. 2 is a perspective view of a shift tray included in the sheet post-processing apparatus according to the embodiment.
Figure 3:
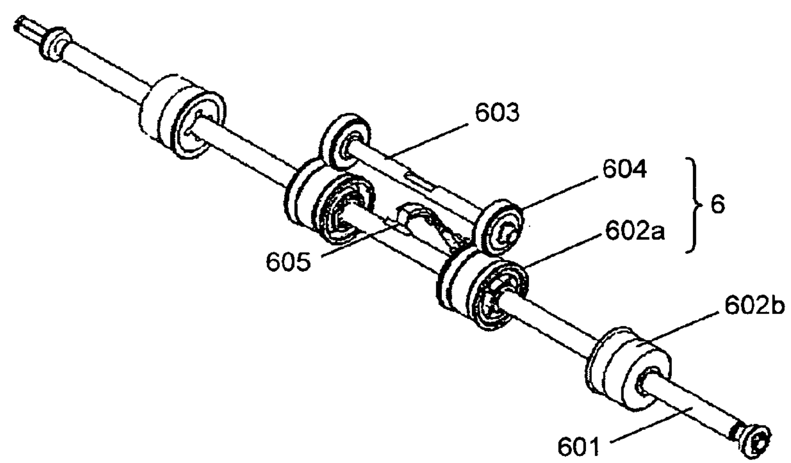
FIG. 3 is a perspective view of a structure of a sheet discharging device according to the embodiment.

FIG. 2 is a perspective of a portion around the shift tray 202 illustrated in FIG. 1 and included in the sheet post-processing apparatus according to the embodiment. FIG. 3 is a perspective view of the sheet discharging device according to the embodiment.

The sheet post-processing apparatus according to the embodiment has the sheet discharging device according to the embodiment near the shift tray 202, as illustrated in FIG. 2. The sheet discharging device according to the embodiment includes, as illustrated in FIG. 3, a rotating shaft (a first rotating shaft) 601 connected to a driving source and a decelerating mechanism not illustrated, discharging driving rollers 602 (602*a* and 602*b*) that are fixed to the rotating shaft 601, discharging driven rollers 604 that are pressed against the discharging driving rollers 602 by a biasing unit not illustrated, and a driven shaft (a second rotating shaft) 603 into which the discharging driven rollers 604 are engaged and that is approximately in parallel with the rotating shaft 601. The sheet discharging device according to the embodiment having such a structure is attached to the discharging unit (discharging port) of the sheet post-processing apparatus, as illustrated in FIG. 2. In the embodiment, four discharging driving rollers 602 are arranged along the rotating shaft 601, and include inner discharging driving rollers 602*a* and outer discharging driving rollers 602*b*. Alternatively, the driven roller may be arranged facing the outer discharging driving roller 602*b*. The inner discharging driving roller 602*a* and the discharging driven roller 604 make up a pair of shift tray discharging rollers (a pair of discharging driving rollers) 6. The rotating shaft 601 is rotated by power supplied by the driving source. The rotation of the rotating shaft 601 rotates the inner discharging driving rollers 602*a* and the outer discharging driving rollers 602*b*, and the discharging driven rollers 604 and the driven shaft 603 are also driven to rotate. The sheet conveyed from the upstream along the conveying path to the pairs of shift tray discharging rollers 6 is nipped between (in the nip of) the inner discharging driving roller 602*a* and the discharging driven roller 604 rotating in conjunction with the rotation of the rotating shaft 601, and discharged onto the shift tray 202. A sheet-strengthening plate spring 605 is arranged approximately at the center of the pairs of shift tray discharging rollers 6.

Figure 4:
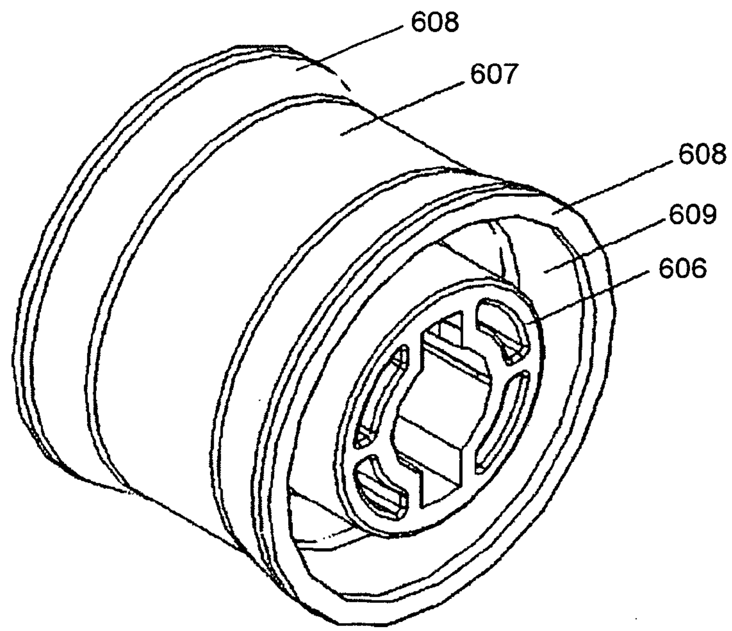
FIG. 4 is a perspective view of an inner discharging driving roller according to the embodiment.
Figure 5:
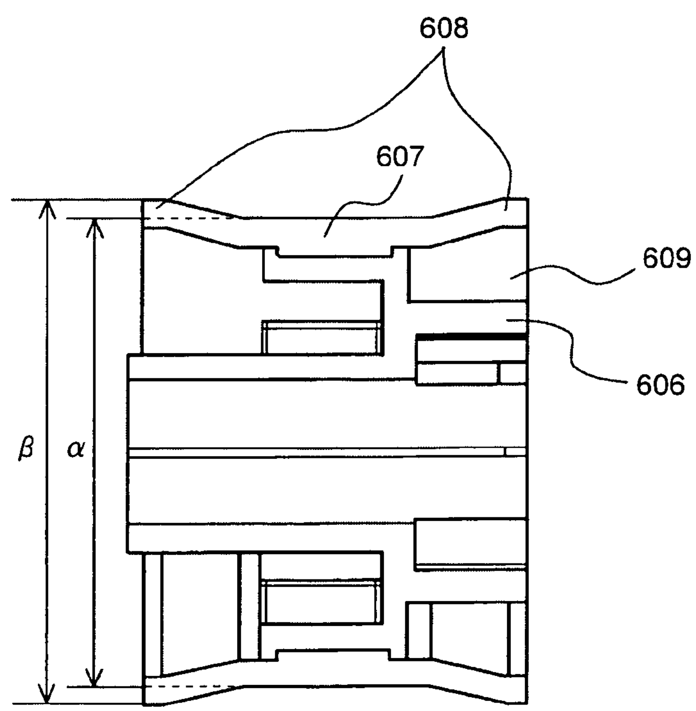
FIG. 5 is a cross sectional view of the internal structure of the inner discharging driving roller according to the embodiment.

FIG. 4 is a perspective view of the inner discharging driving roller 602*a* according to the embodiment. FIG. 5 is a cross sectional view of the internal structure of the inner discharging driving roller 602*a* according to the embodiment.

As illustrated in FIGS. 4 and 5, the inner discharging driving roller 602*a* includes a roller core 606 that is fixed to the rotating shaft 601, and a peripheral member 607 of the roller core that is lightly fitted onto the roller core 606.

The peripheral member 607 and the discharging driven roller 604 form a nip for conveying the sheet. The peripheral member 607 forms a center portion and end portions 608 of the inner discharging driving roller 602*a*, as illustrated in FIGS. 4 and 5. The center portion has a cylindrical (circular tubular) shape. The center portion functions as a portion for applying a sheet-conveying force to move the sheet forward. The end portion 608 has a shape of an approximately circular truncated cone. The end portion 608 has a thin form, and a recessing hollow portion 609 is formed inside (inner side) of the end portion 608.

The surface of the peripheral member 607 (the center portion and the end portions 608) is made of a low-modulus material. The roller core 606 may be made of a material that has a higher elasticity than the material of the peripheral member 607.

As illustrated in FIG. 4, in the peripheral member 607, the top of (i.e., a circle formed by the end of) the center portion is matched with the top of (i.e., a circle formed by a one end of) the approximately circular truncated cones that are the end portions 608. Furthermore, in the end portions 608, the diameter (β indicated in FIG. 5) of the other end of (i.e., a circle formed by the other end of) the approximately circular truncated cones is larger than the diameter (α indicated in FIG. 5) of the one end (the circle formed by the one end) of the approximately circular truncated cones, thus having the form of a brim. Therefore, the end portions 608 may be referred to as brim portions.

Alternatively, the roller core 606 and the peripheral member 607 may be formed integrally using the same elastic material (low-modulus material). In this manner, the costs and the man-hour for assembly can be further reduced.

The sheet discharging device according to the embodiment is configured so that, when a soft sheet such as thin paper is conveyed, a sheet-strengthening force is applied to the sheet being conveyed deforming the sheet into a wave-like form in accordance with the form of the sheet-strengthening brims with a conical shape. At the same time, upon discharging a hard sheet such as thick paper (especially, special coated thick paper), the ends of the rollers are deformed because of the stiffness of the sheet. Therefore, in the peripheral member 607, the brim portions 608 have to be configured appropriately by achieving a balance between the material, the diameter, the thickness of the brim portion, and the positional relationship of the brim portion with respect to the discharging driven roller 604. For example, it is preferable for the thickness of the brim portion 608 to be equal to or less than 1.5 millimeters when the brim portions 608 is made of low-modulus ethylene-propylene (EP) rubber, and the diameter thereof to be equal to or less than $\phi$30.

Figure 6:
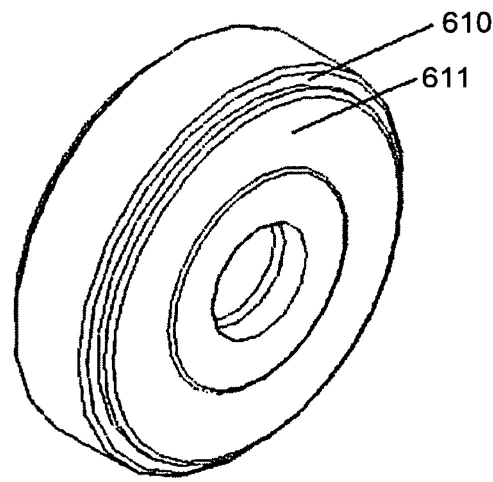
FIG. 6 is a perspective view of a discharging driven roller according to the embodiment.

FIG. 6 is a perspective view of the discharging driven roller according to the embodiment.

The discharging driven roller 604 illustrated in FIG. 6 is pressed against the inner discharging driving roller 602*a* so as to be driven to rotate. Therefore, a driven roller core 611 is made of slidable resin, such as polyoxymethylene (POM), and a peripheral member 610 of the driven roller is a low-modulus member made from EP rubber, for example. The low-modulus member has a lower elasticity than that of the inner discharging driving roller 602*a* (the material of the peripheral member 607) so as to prevent formation of roller traces. Therefore, the hardness of the rubber is set smaller than that of the discharging driving roller 602*a*.

Figure 7:
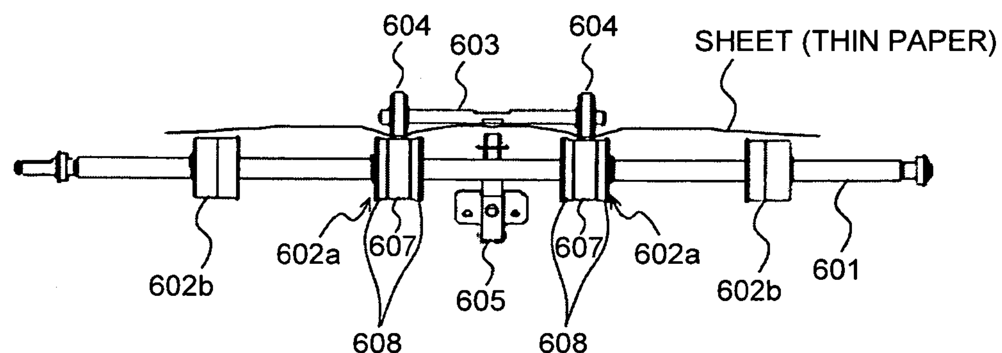
FIG. 7 is a front view of the sheet discharging device according to the embodiment discharging thin paper.

FIG. 7 is a front view of the sheet discharging device according to the embodiment while conveying and discharging thin paper (a soft sheet).

When the sheet discharging device conveys and discharges a soft sheet (for example, thin paper or paper with a grain along a direction perpendicular to the conveying direction), the sheet is passed through the pairs of shift tray discharging rollers 6. At this time, as illustrated in FIG. 7, the sheet is deformed into a wave-like form in accordance with the form of the pairs of shift tray discharging rollers 6 (604 and 602*a*). The width of the inner discharging driving roller 602*a* is approximately 10 to 30 millimeters, and the sheet is lifted by each end (the brim portions 608) of the inner discharging driving roller 602*a* so that the sheet-strengthening force is surely applied to the sheet as if to deform a portion of the sheet into a valley shape. Therefore, the sheet can be discharged out of the shift tray 202 reliably, and sufficient alignment precision can be ensured on the shift tray 202. Because a soft sheet would not be folded by the sheet-strengthening portions (brim portions 608) of the inner discharging driving roller 602*a*, the image quality is not affected as well.

Figure 8:
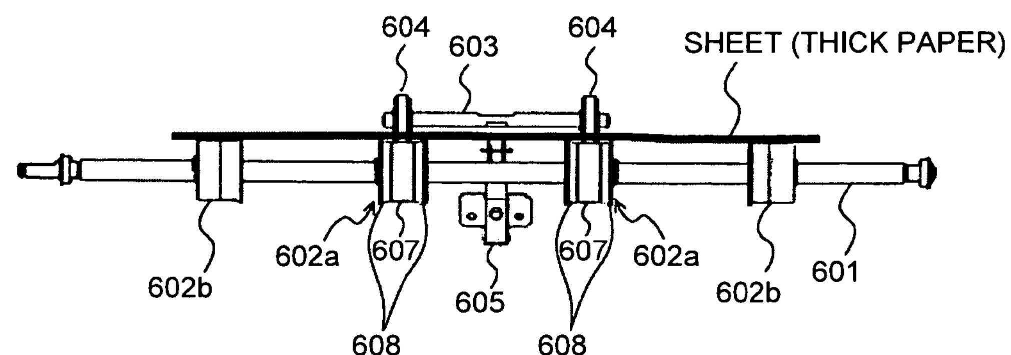
FIG. 8 is a front view of the sheet discharging device according to the embodiment discharging thick paper.

FIG. 8 is a front view of the sheet discharging device according to the embodiment conveying and discharging thick paper (a hard sheet).

When the sheet discharging device conveys and discharges a hard sheet (for example, thick paper or paper with a grain in parallel with the conveying direction), the sheet is passed through the pair of shift tray discharging rollers 6. At this time, as illustrated in FIG. 8, the parts of the brim portions 608 of the pairs of inner discharging driving rollers 602*a* in contact with the sheet deform because of the stiffness of the sheet, and the shapes of the inner discharging driving rollers 602*a* become more flat. Therefore, the sheet would not be folded by the rollers and no trace of rollers is left on the sheet, and degradation of the image quality can be avoided. Because, in the case of hard sheets, stackability of the sheets is maintained by the stiffness of the sheets themselves, the alignment precision is not affected.

As explained above, the sheet discharging device according to the embodiment includes the pair of shift tray discharging rollers 6 (an example of a pair of rollers) having the inner discharging driving roller 602*a* (an example of a driving roller) fixed to the rotating shaft 601, and the discharging driven roller 604 (an example of a driven roller) pressed against the inner discharging driving roller 602*a* so as to be driven to rotate. Furthermore, the inner discharging driving rollers 602*a* or the discharging driven rollers 604 are made of low-modulus material, and the end portions 608 of the roller function as sheet-strengthening brims having a conical shape and a hollow inside. When a soft sheet such as thin paper is passed through the pairs of shift tray discharging rollers 6, the sheet-strengthening force is applied to the sheet and the sheet is deformed into a wave-like form in accordance with the form of the sheet-strengthening brims having a conical shape and a hollow inside. When a hard sheet such as thick paper (especially, special coated thick paper) is passed through the pairs of shift tray discharging rollers 6, the sheet-strengthening brims having a hollow conical form inside are deformed because of the stiffness of the sheet itself. Therefore, any trace of the rollers, caused by folding, does not remain on the sheet.

According to the embodiment, deterioration of stacking quality of soft sheets such as thin sheets can be prevented, while the deterioration in quality of hard sheets such as thick paper (especially, special coated thick paper) caused by the formation of roller trace on the sheet can be prevented. Therefore, the sheet discharging device can support a wide range of sheet types, from soft sheet such as thin paper tending to result in defective stacking to the hard sheets such as thick paper which could suffer from low quality because of the roller traces.

In the structure according to Japanese Patent Application Laid-open No. 2010-006538, the amount of sheet-strengthening force is made variable using the sheet-strengthening ring made, which is an elastic member. However, the amount of force is changed based only on the elasticity of the discharging ring, and Japanese Patent Application Laid-open No. 2010-006538 does not explicitly discloses any hollow structure to allow deformation. Therefore, such a structure has difficulty supporting a wide range of sheet types. Furthermore, a discharging roller having a hollow that deforms when a hard sheet is conveyed is known in Japanese Patent No. 3933829, for example. However, when thin paper is conveyed, this structure cannot apply a sufficient sheet-strengthening force to the paper. Therefore, the hollow portion has to be filled with another member.

Following variations of the embodiment are possible. For example, the center portion and the end portions 608 may be structured as separate members in the peripheral member 607. Furthermore, for example, the structures of the inner discharging driving rollers 602*a* and of the discharging driven rollers 604 (forms, materials, and so on) explained in the embodiment may be opposite. In other words, the discharging driven roller 604 may have the structure illustrated in FIGS. 4 and 5, and the inner discharging driving roller 602*a* may have the structure illustrated in FIG. 6. Furthermore, in the embodiment, the sheet discharging device (an example of the sheet conveying device) is included in the sheet post-processing apparatus. However, the sheet discharging device may be included in an image forming apparatus (e.g., an image forming apparatus illustrated in FIG. 9), for example.

Finally, an example of an image forming apparatus applied in the embodiment will now be explained with reference to FIG. 9. FIG. 9 is a schematic of a structure of an image forming apparatus according to the embodiment. The image forming apparatus according to the embodiment is explained to be a four cycle type image forming apparatus, but may also be a tandem type.

Figure 9:
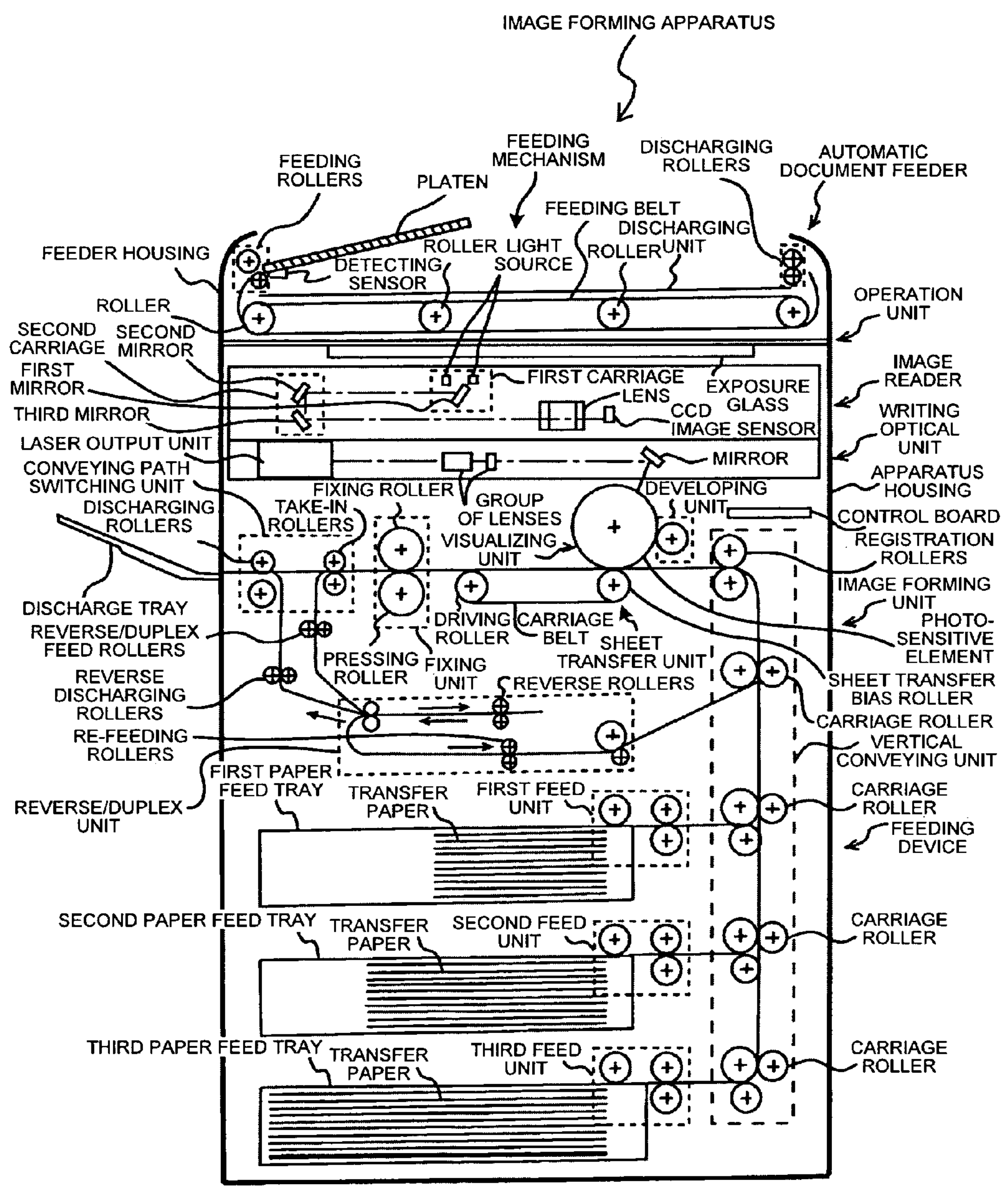
FIG. 9 is a schematic of a structure of an image forming apparatus according to an embodiment.

The image forming apparatus according to the embodiment includes, as illustrated in FIG. 9, an apparatus housing having a vertically elongated rectangular form, an automatic document feeder disposed on top of the apparatus housing, an image reader arranged in an upper portion of the apparatus housing, an image forming unit arranged in a lower portion of the apparatus housing, an operation unit arranged on top of the apparatus housing, and a feeding device arranged in a lower portion of the apparatus housing. Each of these units will be now explained in detail.

The automatic document feeder includes a feeder housing arranged on top of the apparatus housing in an openable and closable manner, a platen disposed on top of the feeder housing, a detecting sensor that detects an original when the original is placed on the platen, feeding rollers that take in the original placed on the platen one sheet at a time, a feeding mechanism that includes a plurality of rollers and a feeding belt, and sends the original taken in by the feeding rollers to an exposure glass included in the apparatus housing, discharging rollers that take in the original conveyed by the feeding mechanism after the image thereon is read on the exposure glass, so that the original is discharged onto a discharging unit formed on top of the feeder housing, a control unit (not illustrated) that performs processes such as controls of each of these units in the automatic document feeder such as the detecting sensor and the discharging rollers, and a process of counting the number of fed originals, and a conveying motor (not illustrated) that drives the feeding rollers and the discharging rollers under the control of the control unit. When the image forming unit issues an instruction for feeding an original, the original placed on the platen is taken in one sheet at a time. The sheet is then guided onto the exposure glass included in the image reader, and the image on the sheet is read by the image reader. The sheet is then conveyed again and discharged onto the discharging unit. The automatic document feeder repeats these processes.

The image reader is fitted into an opening formed in an upper portion of the apparatus housing, and includes the exposure glass that is closed by the automatic document feeder in an openable manner, a first carriage that is arranged movably in the sub-scanning direction along guiding rails (not illustrated) arranged inside of the apparatus housing, and is driven to run at a first speed corresponding to a scaling factor, a light source that is arranged on the first carriage and illuminates the original placed on the exposure glass, and a first mirror that is arranged on the first carriage and reflects the light (optical image) from the original. The image reader also includes a second carriage that is arranged movably in the sub-scanning direction along guiding rails (not illustrated) arranged inside of the apparatus housing, and is driven to run at a speed (second speed) that is a half of the first speed, so that the length of the optical path is kept constant even when the first carriage is moved, a second mirror and a third mirror that are disposed on the second carriage and reflect the optical image reflected from the first mirror, a lens that is arranged movably in the apparatus housing and having the position thereof adjusted depending on the focus and a scale so as to condense the optical image output from the third mirror, and a charge coupled device (CCD) image sensor arranged movably in the apparatus housing and having the position thereof adjusted depending on the focus and a scale so as to receive the optical image condensed by the lens and to convert the optical image into an electrical signal (image signal).

When a command for reading an image is output from the image forming unit, the positions of the lens and the CCD image sensor are moved and adjusted in the lateral direction (sub-scanning direction) depending on the reading scale and the area to be read, and the image of the original placed on the exposure glass is scanned by causing the first carriage and the second carriage to run at the first speed and the second speed respectively along the sub-scanning direction, while the light source on the first carriage is turned on. At the same time, the image is condensed onto the CCD image sensor via the lens, and an image signal is generated. The image signal is then supplied to the image forming unit.

Although not illustrated, the operation unit includes a liquid crystal display (LCD) laid on top of the apparatus housing in a laterally elongated manner, a touch panel that is disposed on the top surface of the LCD and detects a touching operation of an operator performed on the LCD to generate touched position information, and a keyboard disposed near the LCD and having a numeric keypad, a mode clear key, a clear/stop key, and a print key for instructing to start copying operation. The operation unit also includes an operating section (not illustrated) that has a microprocessor, is arranged in the upper portion of the apparatus housing, and communicates with a system controller included in the image forming unit (included in the control board and not illustrated) via an input/output (I/O) port so as to perform operations of receiving a display instruction command, status information and the like output from the system controller and an operation of displaying the information onto the LCD, an operation of processing the touched position information of the touch panel to detect a key on which an operation is performed, a process of detecting details of an operation performed on the keyboard, and a process of transmitting the results of these processes to the system controller.

When an instruction for displaying a copy screen is issued by the system controller, the operation unit receives the instruction via the operating section, and causes the LCD to display, for example, a status message indicating that copying service is currently available, a number-of-copies message indicating the number that is currently specified, an automatic density key that is operated upon specifying an automatic density instruction, an automatic sheet selection key that is operated for automatically selecting transfer paper, a same-scale key that is operated upon specifying the scale to the same scale, a sort key that is operated upon specifying a process for sorting copies into sets in the order of pages, a stack key that is operated upon specifying a process for sorting the copies into sets of the same pages, a staple key that is operated upon specifying a process of stapling each set that has been sorted, a scale key that is operated upon specifying enlarging/reducing scales, a duplex/dividing key that is operated upon specifying a duplex printing mode and the like, an aggregation key that is operated for aggregating a plurality of original images into a single sheet, and a concatenation key that is operated for causing a plurality of image forming apparatuses to print a large number of copies over a network using a Small Computer System Interface (SCSI) cable and the like.

The feeding device includes first to third paper feed trays that are housed in the apparatus housing in an openable and closable manner, and each of which houses transfer paper of a specified size, first to third feed units that take out the transfer sheet from the first to the third paper feed trays respectively, by means of intermittent operations of first to third feed clutches (not illustrated) arranged correspondingly to the first to the third paper feed trays, a vertical conveying unit that includes an intermediate clutch (not illustrated) operating intermittently and a plurality of carriage rollers, and conveys the transfer paper taken out by the first to the third feed units to an upward direction by operating the intermediate clutch intermittently, and registration rollers that take in the transfer paper conveyed by the vertical conveying unit and supply the transfer paper into the image forming unit at an appropriate operational timing. Upon performing a printing operation, the feeding device takes out the transfer paper in the specified size and housed in one of the first to the third paper feed trays, conveys the transfer paper to an upward direction, and supplies the transfer paper to the image forming unit at an operational timing at which the leading edge of a toner image formed on a photosensitive element arrives at a sheet transfer position.

The image forming unit includes a writing optical unit that writes an optical image based on an image signal output from the image reader, a reverse/duplex unit that reverses the front and rear sides of the transfer paper on which an image is formed and supplies the transfer paper into the vertical conveying unit again, or reverses and transfers the transfer paper to the discharge tray, a visualizing unit that visualizes the optical image generated by the writing optical unit as a toner image, a sheet transfer unit that transfers the toner image visualized by the visualizing unit onto the transfer paper taken out by the feeding device, a fixing unit that fuses and fixes the toner on the transfer paper on which the image is transferred by the sheet transfer unit, a conveying path switching unit that guides the transfer paper on which the toner image is fixed by the fixing unit to one of the sheet post-processing apparatus (for example, the sheet post-processing apparatus illustrated in FIG. 1) attached to the left side of the apparatus housing (subsequent to the image forming apparatus) and the reverse/duplex unit, and the control board that controls operations of the entire image forming apparatus. The image forming unit visualizes the image indicated by an image signal received from the image reader as a toner image, transfers the toner image onto the transfer paper having a specified size, fixes the toner image, and supplies the transfer paper to the sheet post-processing apparatus located outside of the image forming apparatus (for example, the sheet post-processing apparatus illustrated in FIG. 1).

In this example, the writing optical unit includes a laser output unit having a laser diode that outputs a laser beam based on the image data received from the control board, a polygon mirror that scans the laser beam output from the laser diode, and a driving motor that drives the polygon mirror in rotation, a group of lenses such as an f-θ lens for fθ-converting the laser beam output from the laser output unit, and a mirror that reflects the laser beam output from the group of lenses so as to supply the laser beam to the visualizing unit. The writing optical unit converts the image data received from the control board into an optical signal, and writes an optical image corresponding to the image data to the photosensitive element included in the visualizing unit, so that an electrostatic latent image is formed thereon. The visualizing unit includes a photosensitive element that is driven to rotate by a main motor (not illustrated), and on which a latent image is formed by the laser beam output from the writing optical unit, a beam sensor (not illustrated) that is arranged near one end of the photosensitive element, generates a main-scanning synchronization signal (LSYNC) upon detecting the laser output from the writing optical unit, and supplies the main-scanning synchronization signal to the system controller, a photosensitive element cleaning unit (not illustrated) that is arranged around the photosensitive element and cleans the photosensitive element, a charging unit (not illustrated) that is arranged around the photosensitive element and charges the photosensitive element evenly, and a developing unit that is arranged around the photosensitive element and develops the electrostatic latent image formed on the photosensitive element.

Upon performing a printing operation, while the photosensitive element is driven to rotate by the driving power of the main motor, the laser beam output from the writing optical unit writes the optical image onto the photosensitive element to form an electrostatic latent image. At the same time, the cleaning unit applies a cleaning process and the charging unit applies a charging process to the surface of the photosensitive element. The developing unit then develops the electrostatic latent image formed on the photosensitive element to form a toner image. The sheet transfer unit includes a sheet transfer bias roller arranged facing the photosensitive element, and to which a bias voltage is applied upon transferring the toner image formed on the photosensitive element to the transfer paper, a driving roller that is driven to rotate by the main motor, and a carriage belt that is stretched across the driving roller and the sheet transfer bias roller to convey the transfer paper to which the toner image formed on the photosensitive element is transferred by the sheet transfer bias roller. Upon performing a printing operation, a predetermined bias voltage is applied to the sheet transfer bias roller, while the carriage belt is pressed against the photosensitive element, holding the transfer paper supplied from the registration rollers between the carriage belt and the photosensitive element, so that the toner image formed on the photosensitive element is transferred onto the transfer paper, and the transfer paper is conveyed to the fixing unit.

The fixing unit includes a fixing roller that is controlled to be at a predetermined temperature and a pressing roller that presses the transfer paper conveyed by the sheet transfer unit against the fixing roller. The fixing unit presses and heats the transfer paper conveyed by the sheet transfer unit, fuses and fixes the toner image formed on the transfer paper, and conveys the transfer paper out to the conveying path switching unit. The conveying path switching unit includes take-in rollers that take in the transfer paper supplied by the fixing unit, a switching claw (not illustrated) that switches the conveying paths for the transfer paper taken in by the take-in rollers, a plurality of discharging rollers that convey the transfer paper to the left side (left side in FIG. 1) onto the discharge tray arranged outside of the image forming apparatus when the transfer paper is guided to the left side by the switching claw, reverse/duplex feed rollers that guide the transfer paper to the reverse/duplex unit when the transfer paper is guided to the lower side (lower side in FIG. 1) by the switching claw, and reverse discharging rollers that guide the transfer paper reversed by the reverse/duplex unit to the discharge tray. The conveying path switching unit takes in the transfer paper conveyed by the fixing unit, switches the conveying directions using the switching claw based on an instruction from the system controller, and guides the transfer paper directly to the discharge tray or to the reverse/duplex unit.

The reverse/duplex unit includes reverse rollers that take in the transfer paper supplied by the conveying path switching unit, conveys the transfer paper in a reverse direction, and reverses the front and rear sides of the transfer paper, and paper re-feeding rollers that supply the reversed transfer paper to the vertical conveying unit in the feeding device. When the reverse/duplex unit receives a reversing and discharging command from the system controller, the reverse/duplex unit takes in the transfer paper supplied by the conveying path switching unit, reverses the conveying direction of (switches back) the transfer paper using the reverse rollers, to discharge the reversed transfer paper onto the discharge tray using the reverse discharging rollers. When the reverse/duplex unit receives a duplex feeding command from the system controller, the reverse/duplex unit takes in the transfer paper supplied by the conveying path switching unit, reverses the conveying direction of the transfer paper using the reverse rollers, and supplies the reversed transfer paper to the vertical conveying unit included in the feeding device using the paper re-feeding rollers.

The control board includes the system controller that controls the operations of the entire image forming apparatus, and controls operations of each of the units included in the image forming apparatus based on a preset program to cause each of the units to perform a reading process of the image of an original, a printing process, and a concatenating process.

The sheet discharging device (sheet conveying device), the sheet post-processing apparatus, and the image forming apparatus according to the embodiment are explained above. However, the present invention is not limited thereto, and various variations are possible within the scope not deviating from the spirit thereof.

According to an aspect of the embodiment of the present invention, a wide range of sheet types, including soft sheets such as thin paper and hard sheets such as thick paper can be handled.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A sheet conveying device, comprising:

a pair of rollers including a first rotating shaft that is rotated by receiving power from a driving source, a driving roller that is fixed to the first rotating shaft, a driven roller that faces and is pressed against the driving roller so as to be driven to rotate, and a second rotating shaft that supports the driven roller, the sheet conveying device conveying a sheet by passing the sheet through the pair of rollers being rotated, wherein:

the driving roller includes a roller core and a peripheral member, the peripheral member includes a cylindrical center portion applying a conveying force to the sheet to move the sheet forward and end portions located at both ends of the center portion and having an approximately circular truncated cone shape, the roller core has a first portion and a second portion along an axis direction, the center portion of the peripheral member is held around the first portion of the roller core, the roller core and the peripheral member are separable from each other, surfaces of the center portion and at least one of the end portions are made of an elastic material, the driving roller further includes a hollow portion, in which the at least one of the end portions is elastically deformed, is formed between the second portion of the roller core and at least one of the end portions of the peripheral member, an outer surface of the center portion is matched with outer surfaces of one end of the end portions, and a diameter of another end of the end portions is larger than a diameter of the one end of the end portions, a material, a diameter, and a thickness of the end portions are configured such that when a thin paper passes through the pair of rollers, the sheet is deformed into a wave-like form in accordance with a form of the end portions, and, when a thick paper passes through the pair of rollers, parts of the end portions are deformed due to the stiffness of the sheet and the sheet being approximately flat, the first portion of the roller core has a recess recessed from an outer periphery of the first portion along the axis direction, the center portion of the peripheral member has a protrusion protruding from an inner periphery of the center portion along the axis direction, and the protrusion is lightly fitted to the recess to hold the center portion of the peripheral member around the first portion of the roller core.

2. The sheet conveying device according to claim 1, wherein the roller core is fixed to the first rotating shaft; and the peripheral member is arranged around the roller core.

3. The sheet conveying device according to claim 1, wherein a material of the driven roller is lower in elasticity than a material of the driving roller.

4. The sheet conveying device according to claim 1, wherein the rollers are arranged in plurality along a same axis.

5. The sheet conveying device according to claim 2, wherein the peripheral member is a thin member that surrounds the roller core.

6. The sheet conveying device according to claim 1, wherein the roller core includes recesses therein.

7. The sheet conveying device according to claim 1, wherein the center portion and the end portions form a thin surface.

8. A sheet post-processing apparatus, comprising:

a sheet conveying device including:

a pair of rollers including a first rotating shaft that is rotated by receiving power from a driving source, a driving roller that is fixed to the first rotating shaft, a driven roller that faces and is pressed against the driving roller so as to be driven to rotate, and a second rotating shaft that supports the driven roller, the sheet conveying device conveying a sheet by passing the sheet through the pair of rollers being rotated, wherein:

the driving roller includes a roller core and a peripheral member, the peripheral member includes a cylindrical center portion applying a conveying force to the sheet to move the sheet forward and end portions located at both ends of the center portion and having an approximately circular truncated cone shape, the roller core has a first portion and a second portion along an axis direction, the center portion of the peripheral member is held around the first portion of the roller core, the roller core and the peripheral member are separable from each other, surfaces of the center portion and at least one of the end portions are made of an elastic material, the driving roller further includes a hollow portion, in which the at least one of the end portions is elastically deformed, is formed between the second portion of the roller core and at least one of the end portions of the peripheral member, an outer surface of the center portion is matched with outer surfaces of one end of the end portions, and a diameter of another end of the end portions is larger than a diameter of the one end of the end portions, a material, a diameter, and a thickness of the end portions are configured such that when a thin paper passes through the pair of rollers, the sheet is deformed into a wave-like form in accordance with a form of the end portions, and, when a thick paper passes through the pair of rollers, parts of the end portions are deformed due to the stiffness of the sheet and the sheet being approximately flat, the first portion of the roller core has a recess recessed from an outer periphery of the first portion along the axis direction, the center portion of the peripheral member has a protrusion protruding from an inner periphery of the center portion along the axis direction, and the protrusion is lightly fitted to the recess to hold the center portion of the peripheral member around the first portion of the roller core.

9. The sheet conveying device according to claim 8, wherein the peripheral member is a thin member that surrounds the roller core.

10. The sheet conveying device according to claim 8, wherein the roller core includes recesses therein.

11. The sheet conveying device according to claim 8, wherein the center portion and the end portions form a thin surface.

12. An image forming apparatus including a sheet conveying device or a sheet post-processing apparatus with the sheet conveying device, the sheet conveying device comprising:

a pair of rollers including a first rotating shaft that is rotated by receiving power from a driving source, a driving roller that is fixed to the first rotating shaft, a driven roller that faces and is pressed against the driving roller so as to be driven to rotate, and a second rotating shaft that supports the driven roller, the sheet conveying device conveying a sheet by passing the sheet through the pair of rollers being rotated, wherein:

the driving roller includes a roller core and a peripheral member, the peripheral member includes a cylindrical center portion applying a conveying force to the sheet to move the sheet forward and end portions located at both ends of the center portion and having an approximately circular truncated cone shape, the roller core has a first portion and a second portion along an axis direction, the center portion of the peripheral member is held around the first portion of the roller core, the roller core and the peripheral member are separable from each other, surfaces of the center portion and at least one of the end portions are made of an elastic material, the driving roller further includes a hollow portion, in which the at least one of the end portions is elastically deformed, is formed between the second portion of the roller core and at least one of the end portions of the peripheral member, an outer surface of the center portion is matched with outer surfaces of one end of the end portions, and a diameter of another end of the end portions is larger than a diameter of the one end of the end portions, a material, a diameter, and a thickness of the end portions are configured such that when a thin paper passes through the pair of rollers, the sheet is deformed into a wave-like form in accordance with a form of the end portions, and, when a thick paper passes through the pair of rollers, parts of the end portions are deformed due to the stiffness of the sheet and the sheet being approximately flat, the first portion of the roller core has a recess recessed from an outer periphery of the first portion along the axis direction, the center portion of the peripheral member has a protrusion protruding from an inner periphery of the center portion along the axis direction, and the protrusion is lightly fitted to the recess to hold the center portion of the peripheral member around the first portion of the roller core.

13. The sheet conveying device according to claim 12, wherein the peripheral member is a thin member that surrounds the roller core.

14. The sheet conveying device according to claim 12, wherein the center portion and the end portions form a thin surface.

* * * * *